July 26, 1960     J. B. POWERS     2,946,879
ILLUMINATING DEVICE

Filed July 26, 1957     3 Sheets-Sheet 3

INVENTOR.
JOHN B. POWERS
BY
Lippincott & Smith.
ATTORNEYS

United States Patent Office 2,946,879
Patented July 26, 1960

2,946,879

ILLUMINATING DEVICE

John B. Powers, Los Angeles, Calif., assignor to The Regents of the University of California, Berkeley, Calif., a corporation of California Filed July 26, 1957, Ser. No. 674,525

12 Claims. (Cl. 240—1)

This invention relates to an illuminating device particularly adapted for use in sorting objects in accordance with color.

In many color sorting operations whereby objects of random color or varying shades of the same color are to be distinguished one from the other, it is desirable to provide for illuminating the objects first in substantially monochromatic light of one spectral composition, and then illuminating the object by monochromatic light of a second spectral composition which is spaced apart from the first monochromatic light in the spectrum and rapidly switching between the two so that the object is rapidly exposed to two different light compositions in succession. With the objects to be sorted illuminated in such fashion, and the reflectance of light from the objects at each color being measurable in accordance with the object color, it becomes evident that if the object is illuminated from the sides, the top, the bottom and the various angles, and the integrated light reflectance is picked up in suitable photoelectrically responsive devices, the reflectance of the object will be found to vary in accordance with the color of the illuminating light.

The invention is particularly concerned with and will be described with respect to one of its important uses in connection with fruit sorting apparatus, although it is to be understood that the application of the principles herein to be disclosed find other uses. For fruit sorting operations, particularly in the citrus industry, for instance, it is desirable to select and identify different fruit pieces in accordance with maturity. If the invention is applied to the sorting of lemons it will be recognized that ripe lemons essentially can be classed into different categories such as dark green, light green, silver, and yellow. All of these lemons are ripe and yet the degree of maturity is different for different colors. Because of the need to ship and distribute the products over wide areas, and because of the desire to make the product available at all seasons of the year, regardless of when the fruit is picked, it is particularly important for storage purposes that dark green lemons, for instance, which are a considerable time away from maturity, shall be segregated with respect to yellow lemons (completely mature), or even with respect to light green or silver lemons. Accordingly, it has been found that segregation of the product is made possible by use of a sorting mechanism (not per se a part of this invention) which is controlled by signals developed from exploring or illuminating the objects first with one substantially monochromatic spectral composition of light and then rapidly shifting to another monochromatic spectral light composition. The average reflectance from the objects at each of these illuminating light values then can be utilized to provide a control signal voltage, for instance, which can operate to select through appropriate selecting apparatus, one object from another in accordance with maturity, following the movement of the separate objects successively before an exploration point.

The invention of this present application is directed primarily to apparatus for exposing each object to be stored alternately to light of different substantially monochromatic spectral composition as the objects pass before an exploration point. In accordance with a preferred embodiment of the invention, provisions are made for developing light which is projected as a light spectrum upon a masking surface having therein a plurality of light-passing apertures usually of elongated formation and of extremely narrow widths so that from the illuminating spectrum only extremely narrow bands of light are selected. By appropriately spacing the apertures with respect to each other it is possible to determine the precise spectral compositions of light passing therethrough to illuminate the objects. For instance, if the apertures are extremely closely spaced, then the light of the two exploring substantially monochromatic spectral compositions will be close to each other in the spectrum, but if the apertures are further apart, greater differences in the spectral combinations will be apparent. Illustratively, one aperture might pass red light and the other apertures might pass light closer toward the greens, or in the region of yellow.

In accordance with the invention, provisions are made for associating with the mask an opaque light-eclipsing element adapted to be moved rapidly relative to the apertures so that the light from one aperture is eclipsed while the light from the other aperture is revealed and then the condition changes or reverses. In the apparatus herein to be described, the light-eclipsing element is of a length at least equal to that of the apertures and is of a width corresponding to the center-to-center spacing of the light-passing apertures. In this way, with the light-eclipsing element being adapted to be moved rapidly in a direction parallel to the spectrum dispersion and with the long dimension of the aperture transverse to the spectrum dispersion, a rapid movement of the light-eclipsing element relative to the apertures serves to commence the eclipsing of light in one aperture while simultaneously revealing light of another spectral composition through the other aperture. The effect produced is that the light passing beyond the masking element with its apertures is first of one substantially monochromatic spectral composition, and then is rapidly shifted to a second substantially monochromatic spectral composition, spaced in the spectrum from the first. The operation is repeated and the passed light alternates between its two successive spectral compositions. The result is that an object arranged to receive the light of the two different spectral compositions reflects more or less of the light from its surface into suitable light-translating elements such as phototubes positioned generally uniformly about the object so that light from all regions is picked up. In this way the light reflectance constituting the integrated output of the light-sensitive elements represents the reflectance at each particular illuminating wavelength. Then, in accordance with principles of operation which this applicant has already explained, and by making use of the principles known as the index of variation of reflectance (also termed the "IVR" of the system), it is possible to select objects accordrming to a ratio method which, per se, forms no part of the present invention.

The invention in its preferred form may be practiced, generally speaking, by various forms of apparatus, of which two are herein described, and with each of which the light from the source as spread into the spectrum is first permitted to fall through one or a pair of apertures and then through the other. In one form of operation, the objectives of the invention may be achieved by providing a vibratory movement of a stretched element having a width when projected upon the apertures, such that it corresponds to the center-to-center spacing of the apertures, then by vibrating the element in a direction parallel to the spectrum dispersion the movement of the vibrated element up-and-down reveals the light through one aperture, while eclipsing the light from the other apertures, after which the process is reversed and repeated as desired. The vibratory element may be driven in any appropriate way, one of which is to provide the masking element as an electrically conducting ferromagnetic component which is moved between suitable magnets. The moving element then moves relative to a permanent magnet and induces into that magnet a current which is suitably amplified and fed through a winding on a toroidal transformer through which the ferromagnetic element is passed as a short circuited turn. The magnetic circuit is completed in any desired fashion as through ground or through an electrically conducting base to which the element is attached.

In a second form of the invention the obturator is in the form of a disc or even a drum element having regularly spaced openings and solid spacing between the openings. The length of the openings is at least equal to that of the aperture length, and the width of the openings, as well as the width of the spacings between the openings, substantially corresponds to the center-to-center spacing of the apertures in a direction parallel to the spectrum dispersion. Consequently, by rapidly rotating the disc element with its apertures and solid portions, an effect generally similar to the vibrating element is readily achieved.

Having the foregoing in mind, the invention includes, among its objects, that of providing a component serving to eclipse and reveal light of two different spectral compositions rapidly and without the requirement of a great deal of space and which may be driven in any desired fashion. Further objects of the invention are those of providing a simplified structure for achieving the aims and purposes of the invention, as well as to provide apparatus which occupies minimum space, which is generally foolproof in its operation, and which is highly efficient in its use.

Other and further objects of the invention will become apparent from a consideration of the description to follow and a consideration of the appended claims taken in connection with this description.

The invention has been illustrated in two of its preferred forms by the several figures of the drawings, in which Fig. 1 is a generally isometric view of a vibratory element, serving to accomplish the illumination of the objects with substantially monochromatic light of different wavelengths or light composition;

Figure 1:
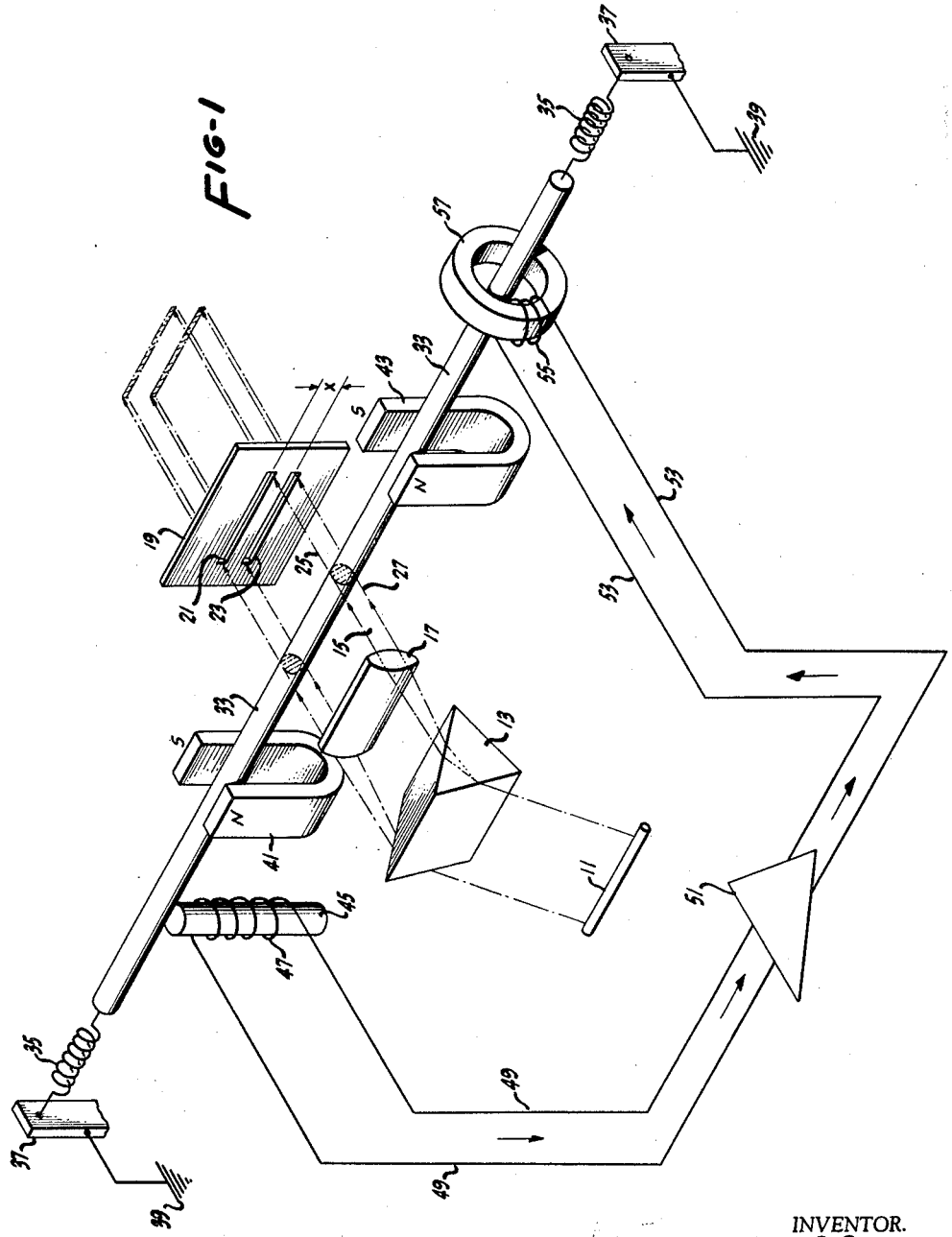

Referring now to the drawings for a further understanding of the invention, light is developed by any desired source such as that schematically represented by the lamp 11 and is directed by an appropriate collimating lens formed as a part of the lamp or arranged adjacent thereto, but not shown in detail by the drawing for convenience of illustration, so that the light falls upon a prismatic light-dispersing element 13. The prism splits the light into spectral colors ranging from one end of the visible spectrum to the other, so that light of all colors, illustratively from red to blue, is directed along the light path conventionally indicated at 15 and between the dot-dash lines having arrows positioned thereon. The light in all colors of the spectrum as so directed is then passed in its optical path through a condensing lens 17 and directed toward a generally planar masking element 19, having a pair of fixed size apertures 21 and 23 therein. The apertures, as can be seen from the drawing, are each of relatively narrow width, and transversely spaced with respect to each other so that light of only substantially monochromatic spectral composition is passed therethrough since the entering light is distributed in a spectrum conventionally indicated as between the light paths 25 and 27. The spacing of the apertures 21 and 23 may be as desired, depending upon the differences in spectral composition of the monochromatic light desired to pass beyond the masking element 19. The long dimension of the apertures 21 and 23 is not material, but the longer aperture, it will be observed, passes a greater light quantity. Any light passing to the right of the masking element 19, as shown, is substantially monochromatic light and is directed toward the object which is adapted instantaneously to be illuminated. The object is schematically shown at 31 in Fig. 2, and, for convenience of illustration, is not shown on Fig. 1.

In the path of the light passing between the condensing lens 17 and the masking element 19, for instance, there is stretched, in one form of the invention, an electrically conducting ferromagnetic string or wire 33, having a diameter (or transverse dimension if shape is other than circular) which corresponds to the center-to-center spacing of the apertures 21 and 23 in a direction parallel to the spectrum dispersion. The electrically conducting ferromagnetic string or wire 33 is spring-tensioned, for instance, for tightening it by means of the springs 35 at either end thereof. The springs are secured to an electrically conducting support member 37 at each end, with this member preferably connected to ground as at 39, so that an electric circuit may be completed through the ferromagnetic string or wire, the springs, the support and ground.

Between the ends of the ferromagnetic string or wire 33 a pair of permanent magnet elements, illustratively, shown here as the U-shaped magnets 41 and 43, are supported. These magnets, it may be noted from the illustration, are at opposite sides of the masking element 19, so that the string vibration is held quite uniform. The magnet elements 41 and 43 are, illustratively, poled so that the north poles, marked N on the drawing, and the south poles, marked S on the drawing, are each on the same side of the wire. Between the magnet 41, for instance, and the spring member 35 which tensions the end of the string or wire 33, there is arranged in a plane at right angles to the field existing between the north and south poles of the permanent magnet a permanent bar magnet 45 having thereon several turns 47 of wire which lead as conductors 49 into an amplifier component shown in Fig. 1 as the element 51, which is explained further in connection with the showing of Fig. 4 later to be discussed.

For the purpose of the present description, it may be assumed that the amplifier 51 serves to amplify any energy supplied thereto by the conductors 49 as the result of current being induced into the bar magnet 45 and the turns 47 thereof, with vibration of the ferromagnetic string or wire 33. The output from this amplifier 51 is supplied through the conductors 53, as indicated by the arrow, to the turns of wire 55 on the toroidal transformer core 57 which surrounds the end of the ferromagnetic string or wire 33 remote from the bar magnet 45. The apparatus is so arranged that the string or wire 33 and its mounting support 37 and the ground connection 39 constitute a short-circuited secondary turn about the toroidal core 57. Thus, it will be appreciated that signal from the amplifier 51 induces a current through the string or wire 33. The field produced by this current interacts with the field produced between the poles of the U-shaped magnets 41 and 43, resulting in a vertical force being exhibited upon the string or wire in accordance with the well-known Ampere's law. With this occurring, the vibrating string varies the flux in the permanent bar magnet 45 arranged in what can be considered a vertical plane as contrasted to the field exerted in a horizontal plane with the U-shaped magnets 41 and 43. The vibrating string or wire 43 induces a voltage into the winding 47, which voltage constitutes the input voltage to the amplifier 51. The gain of the amplifier is made sufficient to supply any losses in the system.

It thus can be appreciated that with the string or wire 33 having a diameter equal to the center-to-center spacing of the apertures 21 and 23, which is represented by the distance X on the drawings, any vibration of the wire or string in the vertical plane will tend to mask one of the apertures 21 or 23, while uncovering the other aperture 23 or 21, as the case may be. If the wire or string 33 in its position of rest is such that the upper half of the aperture 21 is exposed to light of spectral distribution, and the lower half of the aperture 23 is also exposed to light of spectral distribution, it can be appreciated that any change in position of the wire or string rapidly masks the light passing through one aperture, while rapidly revealing the light passing through the other aperture, and vice versa.

Figure 3:
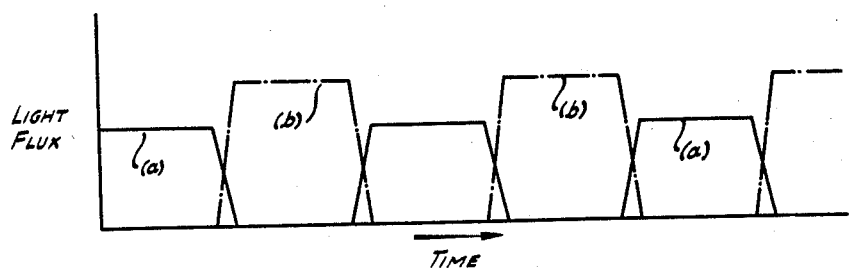
Fig. 3 is a curve generally representing the light flux reflected from the objects at two assumed monochromatic light-exploring wavelengths.

In the curves of Fig. 3 there is plotted the light flux as the ordinate versus time as the abscissa. By this curve it may be assumed, illustratively, that the object which is illuminated by light of the substantially monochromatic spectral composition is such that the reflectance of light of the spectral composition passing through the aperture 21 will provide an output represented by the curve (a), whereas the light reflectance from the assumed object for light of a different spectral composition, as, for instance, passed through the aperture 23, will be that value represented by the curve (b) on Fig. 3. It will be seen, accordingly, that there is very little overlap between the two illuminating monochromatic light values and, consequently, the object illuminated is exposed to light of one or another spectral composition for a relatively long time compared to the time during which transition between illumination and eclipse takes place. This is in contrast to uncovering an aperture by moving an obturating element in the opposite direction as, for instance, by moving an obturating element lengthwise of the apertures 21 or 23, where a substantial time is required completely to cover or uncover the aperture, whereas with the obturating element being moved in a direction parallel to the spectrum dispersion and the aperture being extremely narrow in this direction, in view of the fact that monochromatic light is desired, the time required to completely uncover or cover, as the case may be, the aperture is small compared to the time during which the covered or the uncovered state persists.

Figure 4:
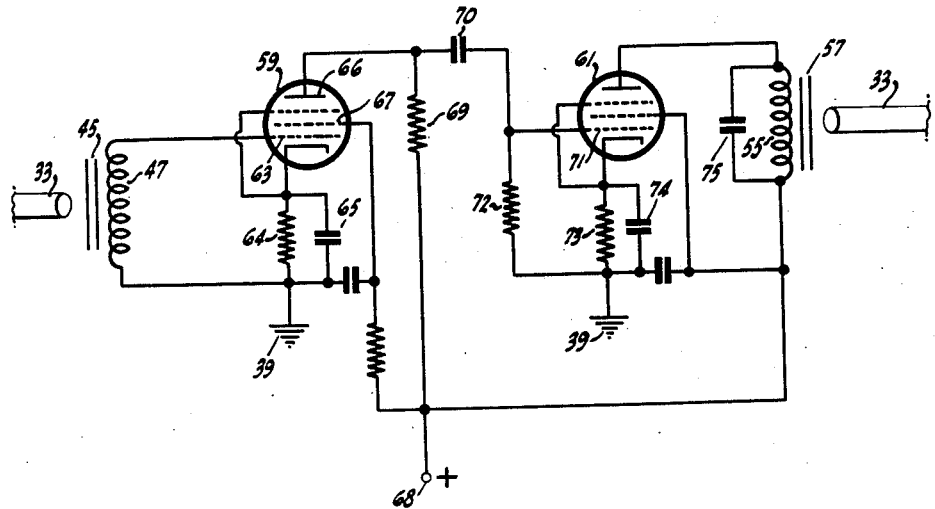
Fig. 4 is a schematic view of a driving circuit for maintaining the vibratory light eclipsing element of Fig. 1 in motion.

Now considering Fig. 4 of the drawing, there is exemplified in purely schematic fashion, one form of circuit by which the amplification of the induced voltage may be effected. In this showing the winding 47 represents the same winding shown by Fig. 1 and the schematically indicated core 45 corresponds to that shown in Fig. 1. Likewise, the component designated as 33 in Fig. 4 is a schematic showing of a portion of the ferromagnetic string or wire of like number, as shown by Fig. 1. The voltages induced into the wires 49 are fed as indicated to the input circuit of the first tube 59 of the cascade comprising tube 59 and tube 61, with the input to tube 59 being supplied upon the control grid element 63 to vary the current flow through the tube. Bias on the tube is provided in well-known manner by the cathode resistor 64, which is appropriately by-passed by the condenser 65. Voltage for each of the plate or anode 66 and the screen electrode 67 is provided from a source of potential (not shown) having its positive terminal connected to the terminal point 68, and its negative terminal poled to ground, as at 39. Output voltages derived across the load resistor 69 are supplied through the coupling condenser 70 to the control grid 71 of the second tube 61 of the cascade and appear as amplified voltages in the winding 55 about the toroidal core 57, as conventionally represented on this figure. Bias to the input of tube 61 is supplied by resistors 72 and 73, the latter of which is by-pasesd by the condenser 74 in well-known fashion.

The vibrated electrically-conducting ferromagnetic string or wire 33 which constitutes the short-circuit secondary turn about the toroidal core is shown by the designation 33 to the right of the winding 55, which, if desired, may be appropriately resonated by the condenser 75. Thus, the voltage induced into the first stage 59 of the cascade is suitably amplified and then further amplified in the second stage 61 which makes up the losses and serves to drive or vibrate the string or wire 33 at its frequency of self-resonance.

Figure 2:
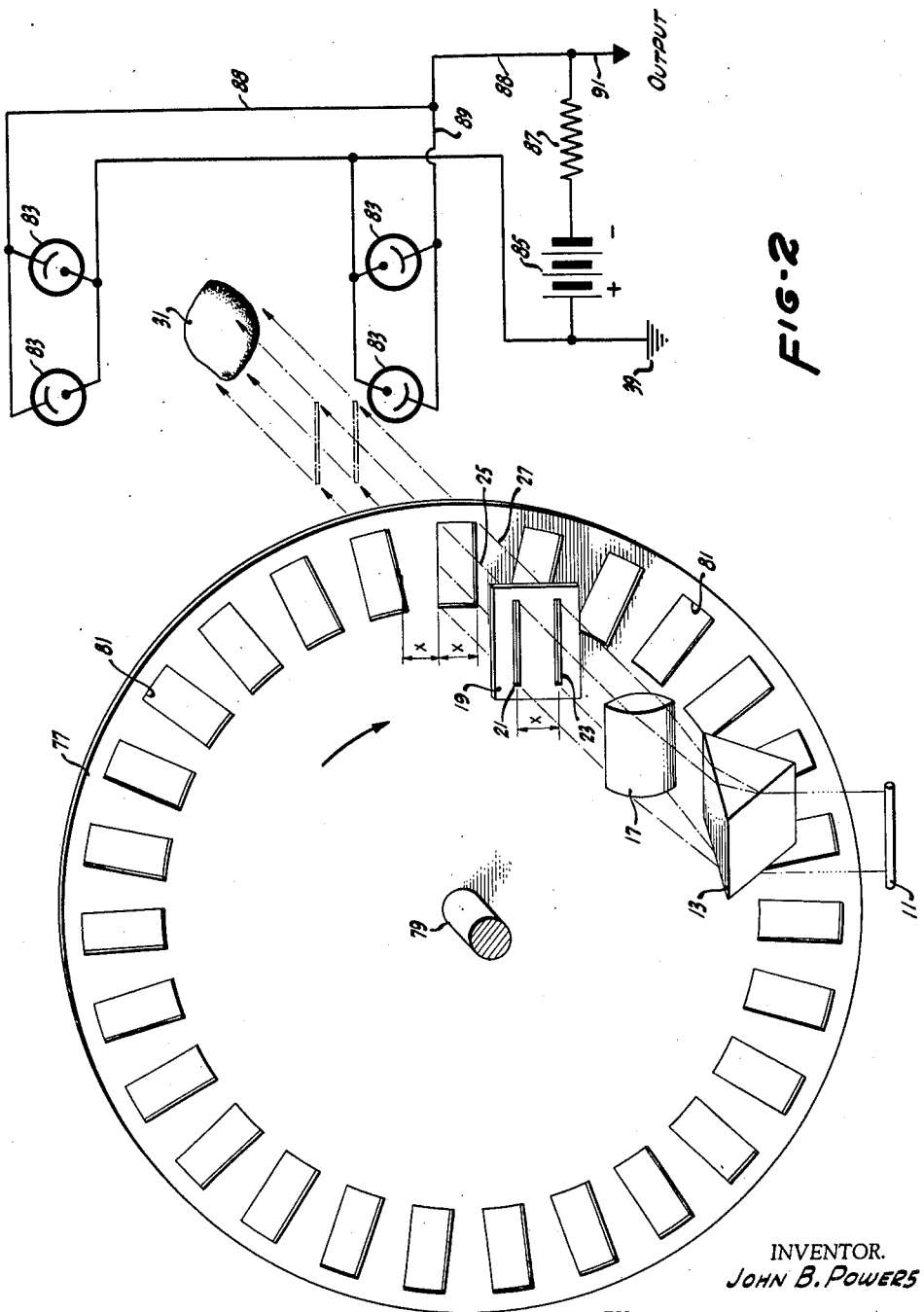
Fig. 2 is a schematic view, partly in isometric, to represent the use of a rotary element to achieve the light segregation and at the same time rapidly to shift between a state of eclipsing and a state of revealing to the objects light of the different substantially monochromatic spectral compositions.

An alternative or modified form of the arrangement which is usable in some installations providing for exposing the object 31 to light of two different monochromatic spectral compositions is shown by Fig. 2. In this figure the light source and collimating lens 11, which can be assumed to be at a relatively long distance from the prism 13, as was the arrangement for Fig. 1, is shown in schematic relationship. The prism 13, the condensing lens 17, and the masking element 19, with its apertures 21 and 23, are arranged generally similarly to the showing of Fig. 1. However, in the light path to the object 31 with a modified arrangement of Fig. 2, there is positioned a rotary disc element 77 which is adapted to turn about a shaft or spindle 79 rotating, for instance, in the direction shown by the arrow. About the periphery of the disc 77 there is arranged a plurality of windows or openings 81, having a height x corresponding to the center-to-center spacing of the apertures 21 and 23 similar to the arrangement of Fig. 1. The spacing of the openings 81 on the disc is also arranged at a distance of approximately x. This distance may be computed either to the midpoint of the length of the openings 81 or to the inside opening, whichever is desired. Due to the circumference of the disc, it is apparent that the spacing closer to the periphery is slightly greater than inwardly toward the hub or shaft 79, about which the disc rotates and this tends to make the revealing and eclipse of light somewhat over a sector shaped path. It will be seen, however, that as the disc rotates, the movement of the openings 81 with respect to the apertures 21 and 23 is such that at the time an opening 81 uncovers the aperture 23, for instance, the space between that opening and the next adjacent opening will be opaque on the disc and mask or eclipse the light which would normally pass through the aperture 21. However, as soon as the opening 81 passes so the edge of the space separating it from the next opening reaches the aperture 23, the light is eclipsed in the aperture 23 and the next succeeding opening 81 opens the light passage through the aperture 21 and the opening in question, so that light passes through along the light paths 27 and 25, respectively, to the object 31. The width of the apertures 25 and of the spacings 27 between the apertures as projected upon the masking element 19 thus corresponds to the center-to-center spacing of the apertures 21 and 23. If the object can be illuminated by this light passed along these two light paths in such a way that by reflecting it in suitable fashion, the light comes to fall upon the object from all of its sides, as well as from above and below, and at various angles, it can be appreciated that any light reflected from the object to strike the conventionally represented photoelectric tubes 83 will, when the integrated light value is derived, represent the average reflectance of the object at the particular light to which the object is instantly exposed.

In the conventional form of illustration in Fig. 2, it will be observed that all of the phototubes 83 are connected in parallel so their outputs add, and it, likewise, will be observed that the phototubes are so poled that they have their anode elements grounded as at 39, and bias voltage is applied through the source 85 and resistor 87, through the conductors 88 and 89 to the tubes. Output voltage is derived on the conductor 91 and fed to any desired form of amplifying device. The type of amplifying device is not, per se, a part of this invention and it may be any desired and well-known type of amplifier for use with the developed currents. The output from the amplifier may, where desired, be chopped at relatively high frequency, so that a number of pulses at the particular amplitude for the instantaneously effective illuminating light wavelength are developed.

Various further modifications of the invention here disclosed may be utilized within the spirit and scope of this invention, it being understood, however, that the modifications here suggested offer alternatives which are considered to bear broad generic relationship to each other.

Having now described the invention, what is now claimed and desired to be secured by Letters Patent is the following:

1. An illuminating device comprising a masking element having a pair of transversely spaced like size elongated fixed size substantially parallel apertures, means to project a light spectrum on the element so that light of different substantially monochromatic spectral composition passes through the individual apertures, an opaque light-eclipsing element of a width corresponding to the center-to-center spacing of the apertures and of a length at least equal to that of the elongated apertures positioned substantially adjacent to the masking element, and means for continuously moving the eclipsing element relative to the apertures in a direction parallel to the spectrum dispersion to reveal light alternately through the pair of apertures in two different spectral compositions.

2. An illuminating device comprising a planar masking element having a pair of transversely spaced like size elongated substantially parallel fixed size apertures, means to project a light spectrum on the planar element so that light of different substantially monochromatic spectral composition passes through the individual apertures, a vibratory opaque light-eclipsing element of a width which when projected upon the masking element substantially corresponds to the center-to-center spacing of the apertures and of a length at least equal to that of the elongated apertures positioned in the light path and adjacent to the masking element and means for continuously vibrating the eclipsing element relative to the apertures in a plane parallel to the spectrum dispersion to reveal light alternately through the pair of apertures in two different spectral compositions.

3. An illuminating device comprising a planar masking element having a pair of elongated substantially parallel apertures, means to project a light spectrum on the planar element so that light of different substantially monochromatic spectral composition passes through the individual apertures, a rotary opaque light-eclipsing element having a series of peripherally arranged light masking regions each of a width corresponding to the center-to-center spacing of the apertures of the masking element and each of a length at least equal to that of the elongated apertures positioned substantially adjacent to the masking element, and means for continuously rotating the eclipsing element relative to the apertures in a direction parallel to the spectrum dispersion to reveal light alternately through the pair of apertures in two different spectral compositions.

4. An illuminating device comprising a planar masking element having a pair of transversely spaced like size elongated substantially parallel fixed size apertures, means to project a light spectrum on the planar element so that light of different substantially monochromatic spectral composition passes through the individual apertures, a vibratory light-eclipsing element of a projected width corresponding to the center-to-center spacing of the apertures and having a length at least equal to that of the elongated apertures and supported substantially adjacent to the masking element and means for vibrating the said vibratory element relative to the apertures in a direction parallel to the spectrum dispersion with the vibration being of sufficient amplitude alternately to mask completely one or the other of the apertures for a portion of the vibratory cycle so that light of the two different spectral compositions is alternately revealed through the masking apertures.

5. An illuminating device comprising a planar masking element having a pair of transversely spaced like size elongated substantially parallel fixed size apertures, means to project a light spectrum on the planar element so that light of different substantially monochromatic spectral composition passes through the individual apertures, a vibratory light-eclipsing element of a projected width corresponding to the center-to-center spacing of the apertures and having a length at least equal to that of the elongated apertures and supported substantially adjacent to the masking element and means for vibrating the said vibratory element relative to the apertures in a direction parallel to the spectrum dispersion with the vibration being of sufficient amplitude alternately to mask completely one or the other of the apertures for substantially half of the vibratory cycle and to concurrently uncover the other aperture so that light of the two different spectral compositions is alternately revealed through the masking apertures.

6. An illuminating device comprising a planar masking element having a pair of elongated substantially parallel apertures, means to project a light spectrum on the planar element so that light of different substantially monochromatic spectral composition passes through the individual apertures, a light obturating disc positioned substantially adjacent to the masking element, said disc having a plurality of elongated apertures therein circumferentially spaced from each other with respect to adjacent aperture edges by a distance substantially corresponding to the center-to-center spacing between the elongated masking element apertures, means to rotate the said disc relative to the masking element and alternately reveal and eclipse the light directed to the elongated apertures, the rotation being to move the apertures in a direction parallel to the spectrum dispersion so that light of two different spectral compositions is alternately revealed through the elongated masking element apertures.

7. An illuminating device comprising a masking element having a pair of transversely spaced, like size elongated fixed size apertures extending substantially parallel to each other, means to project a light spectrum upon the element so that light of two different substantially monochromatic spectral compositions passes therethrough, an obturating element having a masking width equal to the center-to-center spacing between said apertures and of a length at least equal to that of said elongated apertures, said obturating element being positioned substantially adjacent to the masking element, and means for continuously changing the relative positional relationship of the obturating element and the masking element in a direction transverse to the elongated apertures and generally parallel to that in which the spectrum is dispersed so that light is alternately revealed by the apertures and eclipsed with respect thereto.

8. An illuminating device comprising a masking element having a pair of transversely spaced like size elongated fixed size substantially parallel apertures, means to project a light spectrum on the element so that light of different substantially monochromatic spectral composition passes through the individual apertures, a light-eclipsing element having a projected width, when projected upon the masking element, which corresponds to the center-to-center spacing of the apertures and having a length at least equal to that of the elongated apertures, means to support the light-eclipsing element substantially adjacent to the masking element and means for moving the said light-eclipsing element relative to the apertures in a direction parallel to the spectrum dispersion with the movement being of sufficient amplitude alternately to mask and unmask completely one of the apertures for a portion of the motional cycle while simultaneously unmasking and masking the other aperture during the same cycle so that light of the two different spectral compositions is alternately revealed through the masking apertures.

9. An illuminating device comprising a planar masking element having a pair of transversely spaced like size elongated fixed size substantially parallel apertures, means to project a light spectrum on the planar element so that light of different substantially monochromatic spectral composition passes through the individual apertures, an opaque light-eclipsing element of a width corresponding to the center-to-center spacing of the apertures and of a length at least equal to that of the elongated apertures positioned substantially adjacent to the masking element, and means for continuously moving the eclipsing element relative to the apertures in a direction parallel to the spectrum dispersion to reveal light alternately through the pair of apertures in two different spectral compositions.

10. An illuminating device comprising a masking element having a pair of transversely spaced like size elongated substantially parallel fixed size apertures, means to project a light spectrum on the element so that light of different substantially monochromatic spectral composition passes through the individual apertures, a vibratory light-eclipsing element of a projected width corresponding to the center-to-center spacing of the apertures and having a length at least equal to that of the elongated apertures and supported substantially adjacent to the masking element and means for vibrating the said vibratory element relative to the apertures in a direction parallel to the spectrum dispersion with the vibration being of sufficient amplitude alternately to mask completely one or the other of the apertures for a portion of the vibratory cycle so that light of the two different spectral compositions is alternately revealed through the masking apertures.

11. An illuminating device comprising a planar masking element having a pair of substantially parallel apertures, means to project a light spectrum on the planar element so that light of different substantially monochromatic spectral composition passes through the individual apertures, a rotary light-eclipsing element having a series of alternate transparent regions and opaque regions peripherally arranged, each such region being of a width substantially equal to the center-to-center spacing of the apertures of the masking element and each being of a length at least equal to the length of the apertures, said rotary element being positioned substantially adjacent to the masking element, and means for continuously rotating the eclipsing element to produce a procession of said transparent and opaque regions past the elongated apertures in a direction parallel to the spectrum dispersion to reveal light alternately through the apertures in two different spectral compositions.

12. An illuminating device as defined in claim 6, wherein each of the apertures in the light obturating disc has a width substantially equal to the center-to-center spacing between the apertures in the masking element.

References Cited in the file of this patent

UNITED STATES PATENTS

| | | |
|---|---|---|
| 2,439,373 | Stearns | Apr. 16, 1948 |
| 2,514,633 | Frayne | July 11, 1950 |
| 2,515,236 | Kunins | July 18, 1950 |
| 2,640,137 | Ketchledge | May 26, 1953 |
| 2,648,249 | Canada | Aug. 11, 1953 |
| 2,759,602 | Baigent | Aug. 21, 1956 |